US010222252B2

United States Patent
McClintock

(10) Patent No.: US 10,222,252 B2
(45) Date of Patent: Mar. 5, 2019

(54) PORTABLE VERIFICATION SYSTEM AND METHOD FOR USE IN VERIFYING A GAS PIPELINE FLOW METER WHEN IN FIELD

(71) Applicant: Big Elk Energy Systems, LLC, Tulsa, OK (US)

(72) Inventor: Dennis McClintock, Tulsa, OK (US)

(73) Assignee: Big Elk Energy Systems, LLC, Tulsa, OK (US)

( * ) Notice: Subject to any disclaimer, the term of this patent is extended or adjusted under 35 U.S.C. 154(b) by 25 days.

(21) Appl. No.: 15/588,630

(22) Filed: May 6, 2017

(65) Prior Publication Data

US 2018/0045553 A1    Feb. 15, 2018

Related U.S. Application Data

(60) Provisional application No. 62/333,015, filed on May 6, 2016.

(51) Int. Cl.
*G01F 25/00* (2006.01)
*G01F 1/66* (2006.01)

(52) U.S. Cl.
CPC ........ *G01F 25/0053* (2013.01); *G01F 25/003* (2013.01); *G01F 1/66* (2013.01)

(58) Field of Classification Search
CPC . G01F 1/667; G01F 1/662; G01F 1/66; G01F 25/0007; G01F 1/668; G01F 25/0053; G01F 15/00; G01M 3/243; F16L 27/12
USPC ......................................... 73/195, 196, 197
See application file for complete search history.

(56) References Cited

U.S. PATENT DOCUMENTS

| 1,492,204 | A | | 4/1924 | Clark | |
|---|---|---|---|---|---|
| 3,446,055 | A | * | 5/1969 | Ewers | ................. G01F 25/0015 137/268 |
| 3,958,443 | A | * | 5/1976 | Berrettini | .............. G01F 25/003 73/1.34 |

(Continued)

OTHER PUBLICATIONS

"Multipath Ultrasonic Gas Flow Meter, Flow Calibration Procedure." FMC Technologies. Oct. 2009. pp. 1-32. Accessed online at <http://info.smithmeter.com/literature/docs/mnks013.pdf>.*

(Continued)

*Primary Examiner* — Lisa M Caputo
*Assistant Examiner* — Punam P Roy
(74) *Attorney, Agent, or Firm* — Gable Gotwals

(57) ABSTRACT

Embodiments of a portable verification system can move from one in-field gas flow meter location to another and temporarily connect downstream of a main pipeline's meter run or station. A control valve of the portable verification system allows volume measurement at different flow velocities to be verified. In some embodiments, the portable verification system is connected to the meter run and the main pipeline by a corresponding slip or linearly adjustable pipeline section. This section can extend horizontally and vertically, as well as swivel to provide versatility when connecting in the field. Adaptor fittings having one flange sized for and fitted to the inlet and outlet ends of the portable verification system and another flange sized for the meter run or main pipeline connection provide additional versatility. Downtime is limited to the time required to complete a circuit between the meter run, portable verification system, and main pipeline.

26 Claims, 6 Drawing Sheets

(56) References Cited

U.S. PATENT DOCUMENTS

| | | | | |
|---|---|---|---|---|
| 4,106,328 A | * | 8/1978 | Neeff | G01F 25/0015 280/404 |
| 4,646,575 A | * | 3/1987 | O'Hair | G01F 1/667 73/861.31 |
| 4,821,557 A | * | 4/1989 | Beeson, III | G01F 1/50 73/1.26 |
| 5,060,514 A | * | 10/1991 | Aylsworth | G01N 29/024 73/24.01 |
| 5,207,088 A | * | 5/1993 | Geery | G01F 1/08 73/1.16 |
| 5,421,188 A | * | 6/1995 | Sager | G01F 25/0007 700/282 |
| 5,895,863 A | * | 4/1999 | Glaudel | G01F 25/0007 73/861.01 |
| 6,471,249 B1 | * | 10/2002 | Lewis | F16L 27/12 285/22 |
| 6,629,447 B1 | * | 10/2003 | Collins | G01F 25/0007 73/1.16 |
| 6,721,674 B2 | * | 4/2004 | Borzsonyi | G01F 1/36 702/100 |
| 7,475,586 B2 | * | 1/2009 | Swanek | G01F 25/0015 73/1.17 |
| 7,685,861 B2 | * | 3/2010 | Lynch | G01N 29/02 73/1.86 |
| 7,942,068 B2 | * | 5/2011 | Ao | G01F 25/0007 702/79 |
| 8,302,455 B2 | * | 11/2012 | Straub, Jr. | G01F 1/66 73/1.34 |
| 8,816,866 B2 | * | 8/2014 | Day | G01F 1/666 340/603 |
| 9,010,196 B2 | * | 4/2015 | Kurth | G01F 7/00 73/861 |
| 9,316,517 B2 | * | 4/2016 | Forbes | G01F 1/667 |
| 2009/0205400 A1 | * | 8/2009 | McPeak | G01F 1/58 73/1.16 |
| 2013/0080080 A1 | * | 3/2013 | Forbes | G01F 1/667 702/48 |
| 2013/0179374 A1 | * | 7/2013 | Hains | G01F 7/00 705/413 |
| 2013/0340519 A1 | * | 12/2013 | Kurth | G01F 7/00 73/196 |

OTHER PUBLICATIONS

"meter run." Academic Press Dictionary of Science and Technology, edited by Christopher G. Morris, Elsevier Science & Technology, 4th edition, 1992. Credo Reference, http://search.credoreference.com/content/entry/apdst/meter_run/0. Accessed Jul. 5, 2017.*

Haner, Wayne. "Ultrasonic Flow Meter Calibration, Considerations and Benefits." TransCanada Calibrations. Accessed online at <http://asgmt.com/wp-content/uploads/pdf-docs/2009/1/046.pdf> on Jun. 26, 2017.*

Bowles Jr, E.B.. (2012). In-situ (on-site) gas meter proving. International School of Hydrocarbon Measurement—87th Annual International School of Hydrocarbon Measurement 2012. vol. 2. 760-769. Accessed online Jan. 9, 2018 <www.measurementlibrary.com>.*

Rudroff, "Onsite Proving of Gas Flow Meters", "http://asgmt.com/wp-content/uploads/pdf-docs/2011/1/M30.pdf", 2011, Publisher: Welker Flow Measurement Systems Inc.

* cited by examiner

PORTABLE VERIFICATION SYSTEM AND METHOD FOR USE IN VERIFYING A GAS PIPELINE FLOW METER WHEN IN FIELD

CROSS-REFERENCE TO PENDING APPLICATIONS

This application claims priority to and the benefit of U.S. 62/333,015 filed May 6, 2016.

BACKGROUND

This disclosure relates to gas flow measurement equipment and, in particular, to equipment, systems, and methods designed to improve the accuracy of gas flow measurement used in custody transfer transactions along a gas pipeline.

Because of the tremendous volume of gas being transferred between pipeline companies, small measurement errors can have very large financial effects. Therefore, ultrasonic gas flow meters used in gas pipelines must be calibrated from time-to-time. However, doing this calibration requires shutting down flow through the pipeline, removing the meter run from the line, and sending the meter run to a calibration laboratory that makes use of a reference bank of meters. See FIG. 1.

Until the calibrated meter run is returned from the laboratory, which is typically a week or more, and reinstalled in the line, no gas is flowing through the line. The cost and lost revenue associated with this shutdown prevents many pipeline owners from calibrating the meter as often as it should be calibrated.

SUMMARY

Embodiments of a portable verification system can move from one in-field gas flow meter location to another in-field gas flow meter location and temporarily connect downstream of a main pipeline's meter run or station. A same volume of gas that passes through the field meter also passes through a calibrated ultrasonic gas flow meter (the reference meter) of the portable verification system before the volume of gas reenters the main pipeline. A control valve of the portable verification system allows volume measurement at different flow velocities to be verified. The volume of gas measured by the field meter is then compared with that of the portable verification system's calibrated meter. The field meter or its data can then be adjusted as needed.

In some embodiments, the portable verification system is connected to the meter run and the main pipeline by linearly adjustable pipeline sections. These sections can be arranged to extend horizontally and vertically, as well as swivel to provide versatility when connecting in the field. Adaptor fittings having one flange sized for and fitted to the inlet and outlet ends of the portable verification system and another flange sized for the meter run or main pipeline connection provide additional versatility.

After the field meter is verified to a desired level of accuracy, the portable verification system can be disconnected and the meter run reconnected to the main pipeline. The portable verification system can then be transported to another field location. If a decision is made to send the field meter to a calibration lab for calibration, the portable verification system can remain in place until the newly calibrated field meter is returned and reinstalled in the meter run.

ELEMENTS AND NUMBERING USED IN THE DRAWINGS AND DETAILED DESCRIPTION

Figure 1:
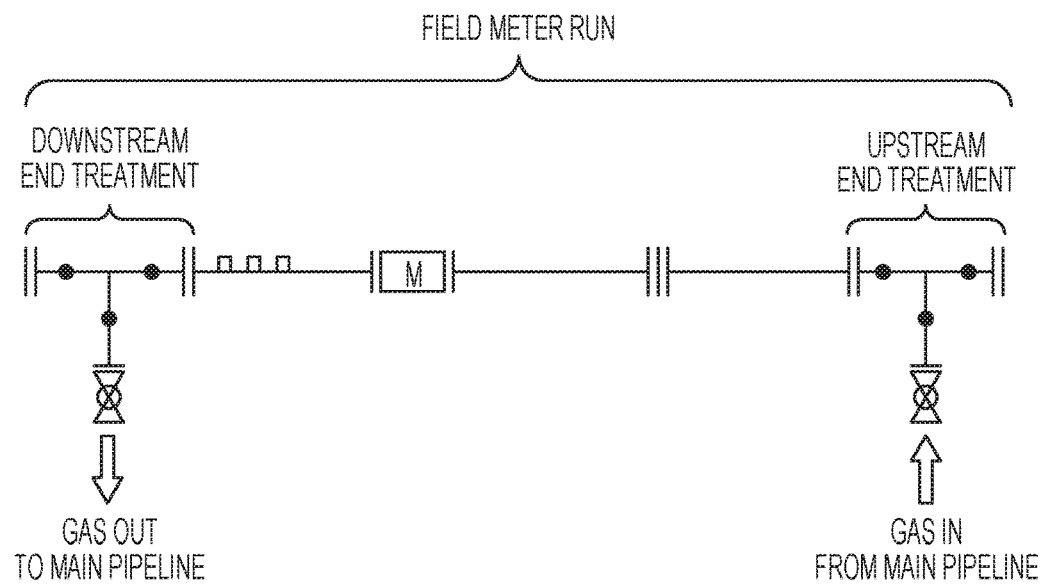
FIG. 1 is a schematic of a prior art field meter run connected to a main pipeline. When the in-field gas flow meter of the run requires calibration or verification, the main pipeline must be shut down to remove the field meter and remain shut down until the meter is returned from a calibration lab and reinstalled.

5 Portable verification system
13 Reference measurement section or meter run
11 Inlet end
10 Pipe
15 Calibrated ultrasonic gas flow meter (reference meter)
17 Turn
19 Control valve
21 Outlet end
23 Measurement trailer
30 First slip or linear adjustable pipeline section (horizontal)
31 End (inlet or outlet depending on direction of flow)
33 Outer pipe
35 End
37 Inner pipe
41 End (inlet or outlet depending on direction of flow)
43 Lift eye
45 Elbow
47 Lift eye
49 Lap joint flange
50 Sealing means
51 Slip joint or slip joint adaptor
53 Packing gland
55 Head
57 Pocket
59 O-ring
61 Spacer
63 Follower or pusher 70 Second slip linear adjustable pipeline section (vertical)
90 Adaptor
91 Flange
93 First end
95 Bolt hole pattern
97 Flange
99 Second end
101 Bolt hole pattern
M Field meter (meter under test)

DETAILED DESCRIPTION

Figure 2:
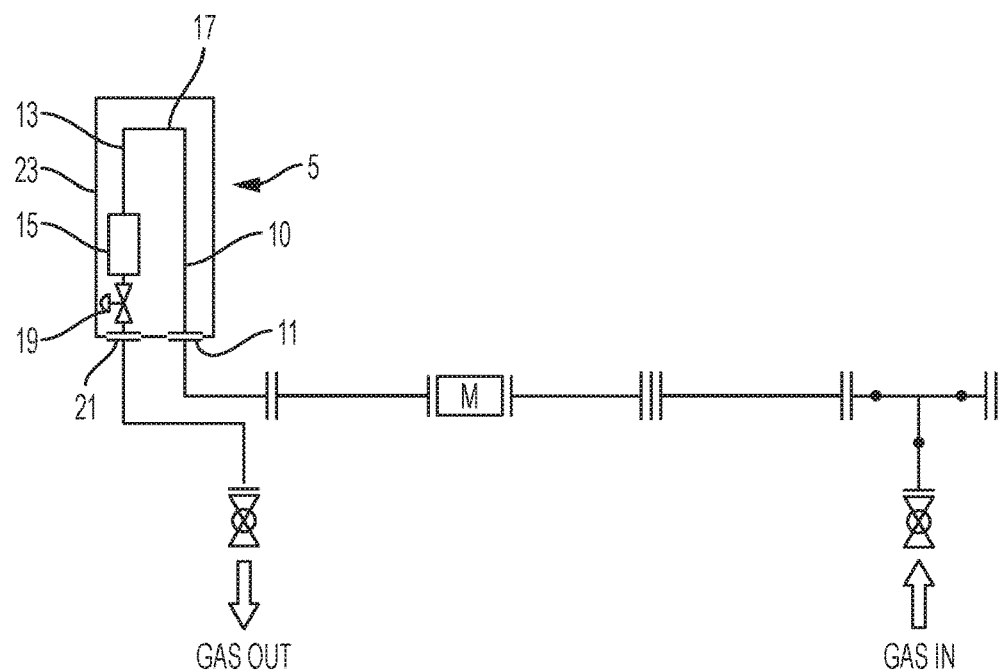
FIG. 2 is a schematic of an embodiment of portable verification system when connected to a downstream end of the field meter run. Gas flows through the field meter run and through a calibrated ultrasonic gas flow meter of the portable verification system before returning to the main pipeline. The main pipeline is shut down only for the amount of time required to complete a circuit between the field meter run, the portable verification system, and the main pipeline.

Referring now to FIG. 2, in embodiments of a portable verification system 5 a reference measurement section or meter run 15 is trailered to a main pipeline transporting gas and connected downstream of the main pipeline's meter run or station. In some embodiments, the portable verification system 5 is mounted on a measurement trailer 23. The trailer 23 may be no wider than a standard flatbed trailer (about 102" in width). The amount of downtime experienced by the main pipeline is limited to the amount of time needed to complete a circuit between a downstream end of the field meter run, the portable verification system 5, and the main pipeline. In some embodiments, this circuit can be completed in less than 12 hours, less than 10 hours, or less than 8 hours. Disconnection of the system 5 and reconnection of the field meter run to the main pipeline may be accomplished in similar time frames.

The reference meter run 13 includes an inlet end 11 connectable to an end treatment of the field meter run, an outlet end 21 connectable to a flanged connection fitting of the main pipeline, and a calibrated ultrasonic gas flow meter (the reference meter) 15 located between the inlet end and outlet ends 11, 21. Gas flowing through the field meter M enters the portable verification system 5 and flows through the calibrated ultrasonic flow meter 15. The gas then flows back into the main pipeline.

The reference meter run 13 may include at least one turn 17 between the ends 11, 21 and can be arranged in some embodiments as a U-shaped or C-shaped run. In embodiments, the reference meter run 13 also may include a flow conditioner located ahead of the meter 15. The run 13 may also include means to attenuate ultrasonic waves and prevent their return toward, and interference with, the meter 15. Those means include elbows and blind flanges.

The pipe 10 used in the portable verification system 5 can be the same diameter as that of the main pipeline's meter run. For example, if the field meter run uses 12-inch pipe, system 5 can use 12-inch pipe. In other embodiments, a different size (larger or smaller) pipe. Where different size pipe is used, appropriate adjustments are made to equate the volume of gas flowing per unit time through the field meter M with that flowing through the calibrated ultrasonic gas flow meter 15. In other words, the calibrated reference meter 15 experiences the same volume of gas the field meter M experiences at either the same velocity as the field meter M or at a proportional velocity. Because the meter 15 is located downstream of the field meter M, the flow through the field meter M is an unadulterated flow, unaffected by the presence of the portable verification system 5.

A control valve 19 may be installed downstream of the calibrated ultrasonic gas flow meter 15, such as between the meter 15 and the outlet end 21, to restrict flow through the valve 19 and drop flow velocity through the field meter M by way of backpressure. For example, if the flow is 55 fps through the field meter M, flow can be restricted through the valve 19 to drop the flow to rates below 55 fps and at or above 5 fps. Depending on whether size-on-size piping is used, the calibrated ultrasonic flow meter 15 experiences the same or a proportional velocity through it. In some embodiments, at least three different flow rates are selected, with corresponding volume measurement data provided for verification purposes.

Figure 3A:
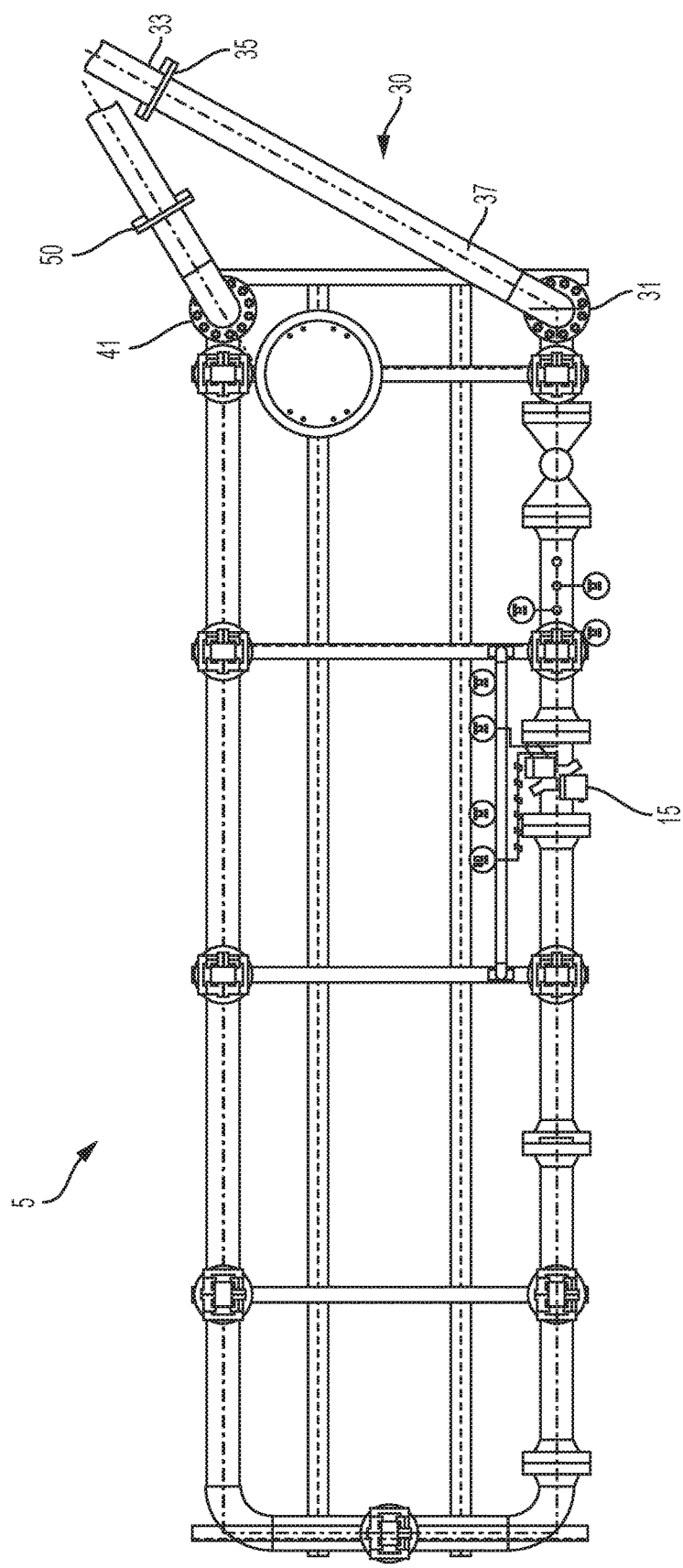
FIGS. 3A and 3B are a schematic of an embodiment of a portable verification system that includes a linearly adjustable pipeline section (see FIG. 3A) connecting the system to a field meter run of a main pipeline (see FIG. 3B). The adjustable pipeline section may be arranged to extend horizontally as well as vertically to make a connection between the portable verification system and a corresponding connection point of the field meter run or main pipeline.
Figure 3B:
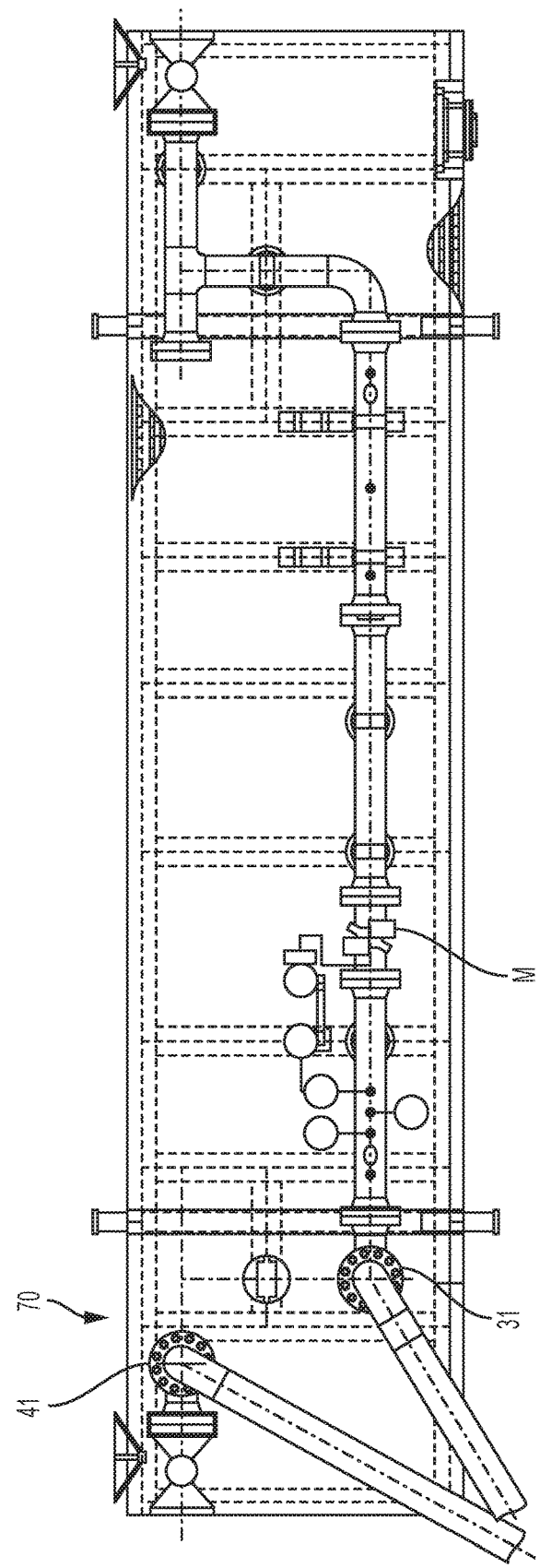
Figure 4:
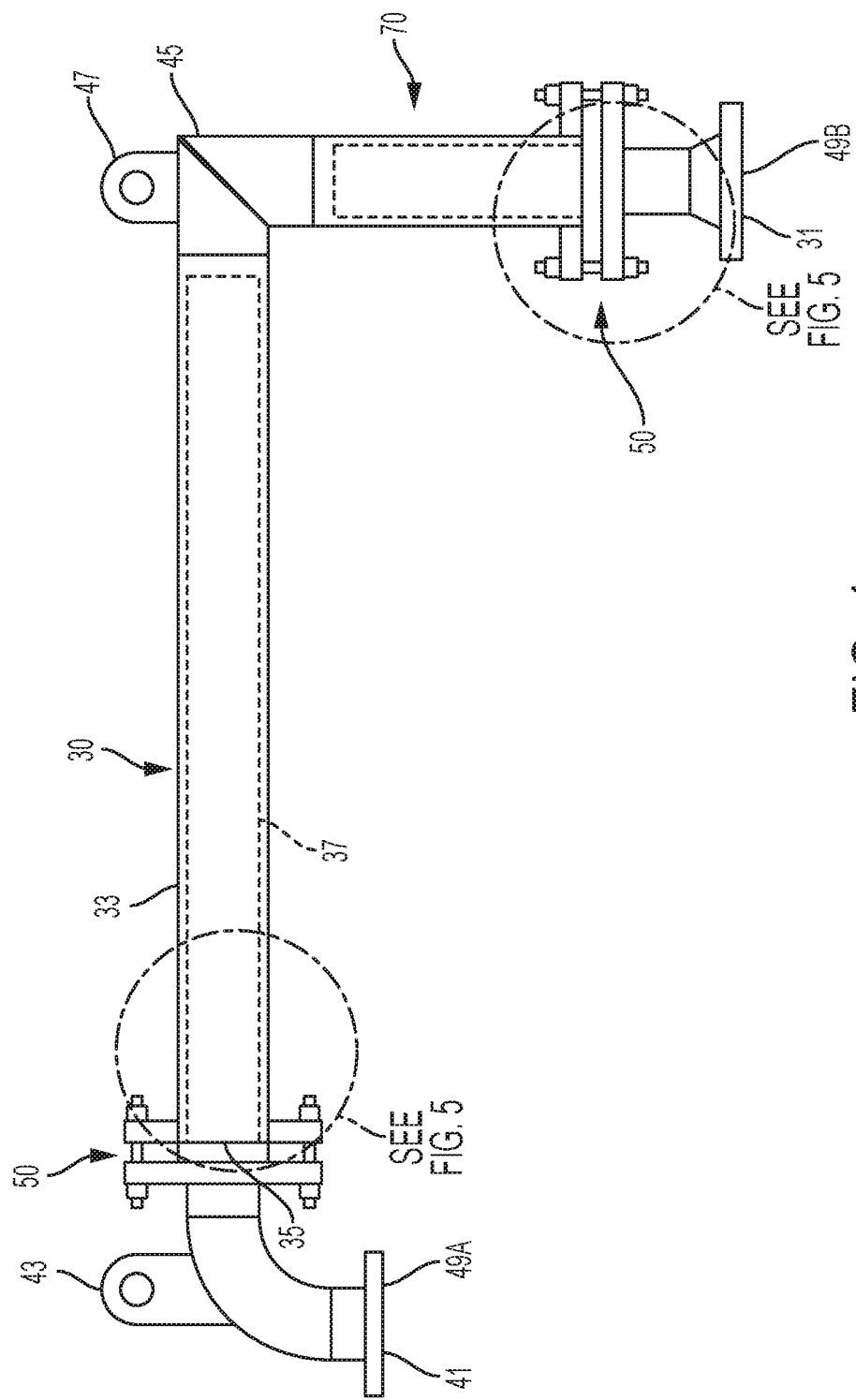
FIG. 4 is an embodiment of a slip joint adaptor that may be used to seal the linearly extendable pipeline section of FIG. 3.
Figure 5:
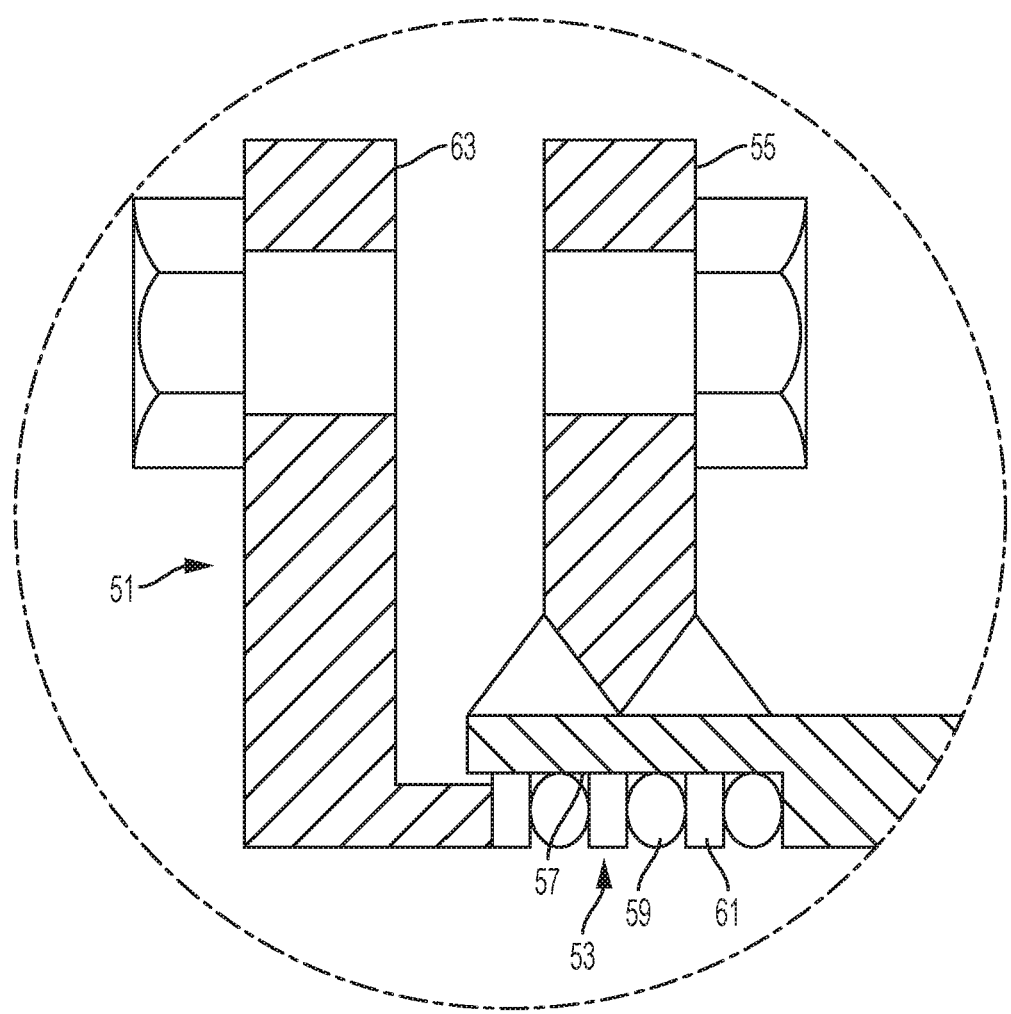
FIG. 5 is an enlarged view of the slip joint adaptor of FIG. 4.

Referring now to FIGS. 3 to 5, in some embodiments, at least one of the inlet and outlet ends 11, 21 includes at least one slip or linearly adjustable pipeline section 30 or 70 spanning between it and a corresponding connection point of the field meter run or main pipeline. The first linearly adjustable pipeline section 30 may be arranged to extend horizontally. For example, the linearly adjustable pipeline section 30 may extend in overall length in a range of about 10 to 25 feet. The second linearly adjustable pipeline section 70 may be arranged to extend vertically. For example, the linearly adjustable pipeline section 70 may extend in a range of 4 to 7 or 8 feet, permitting one section 30 to cross over another section 30. When used in combination, the sections 30 and 70 may be connected by an elbow 45 having a lift eye 47. The linearly adjustable pipeline section 70 may also be used to swivel or orient section 30 into a desired clock position or angular orientation.

The linearly adjustable pipeline sections 30, 70 can include an outer pipe 33, an inner pipe 37 housed by and extendable from the outer pipe 33, and means to seal 50 an end 35 of the outer pipe 33 about the inner pipe 37. The inlet or outlet ends 31, 41 of the section 30, 70 may include a lap joint flange 49A, 49B for connection to a corresponding inlet or outlet end 11, 21 of the portable verification system 5 or to the field meter run or main pipeline. In some embodiments, one end 31, 41 is an elbow and the other end 41, 31 is straight. A lift eye 43 may be added to the inlet or outlet end 31, 41.

The means to seal 50 the outer pipe 33 about the inner pipe 37 may be a slip joint 51 that includes a packing gland 53 arranged in a pocket 57 located between a head 55 and follower or pusher 63. In some embodiments, the packing gland 53 includes at least two O-rings 59 with a moveable spacer 61 located in between. As the pusher 63 is drawn toward the head 55, the O-rings 59 become compressed between the head 55 and spacer 61, and between the spacer 61 and pusher 63, and therefore expand into sealing engagement with pipe 37.

Figure 6:
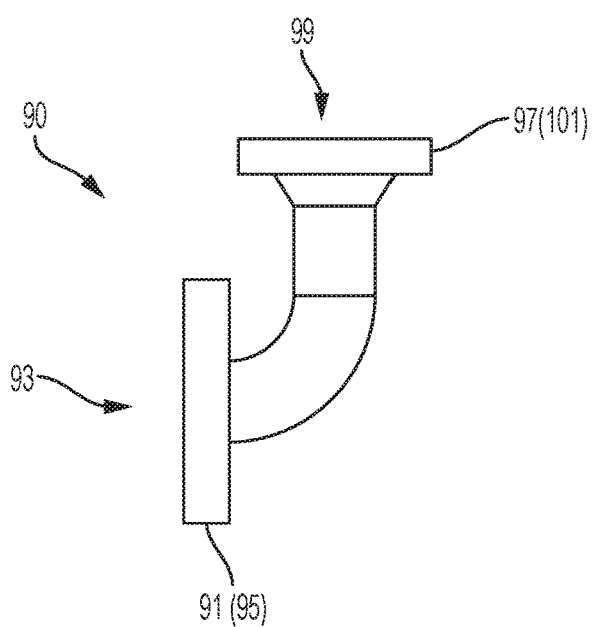
FIG. 6 is a front elevation view of an embodiment of an adaptor fitting that may be used to connect the inlet or outlet end to a corresponding outlet or inlet flange of the meter run or main pipeline, respectively.
Figure 7:
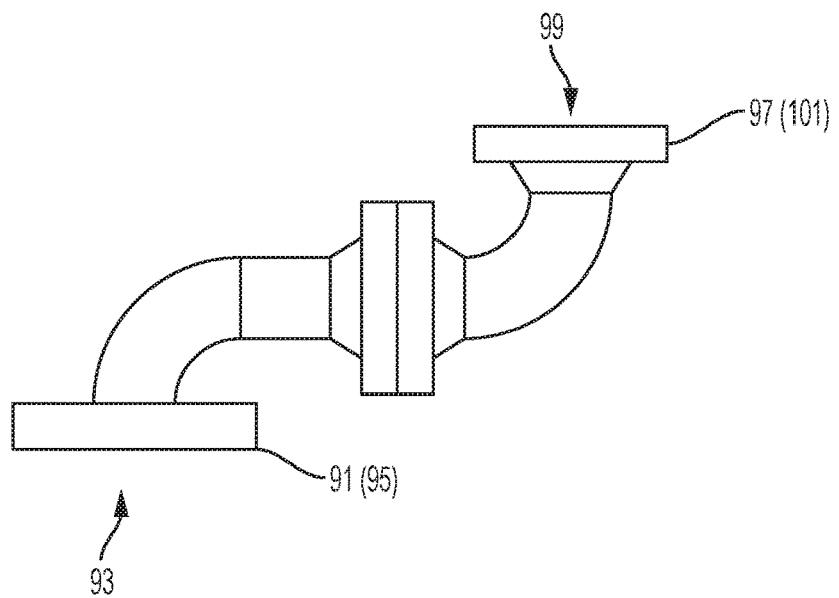
FIG. 7 is a front elevation view of another embodiment of an adaptor fitting. In embodiments, the flange on the meter run or main pipeline side of the fitting may vary from one adaptor to the next with the flange on the portable verification side of the fitting being the same across the different adaptor fittings.

Referring now to FIGS. 6 & 7, because of differences in connection flanges used on meter runs and main pipelines, the portable verification system 5 may also use at least one adaptor fitting 90. In embodiments, adaptor fitting 90 is connectable to the inlet or outlet ends 11, 21 of the portable verification system 5 or to the inlet or outlet ends 31, 41 of the linear adjustable pipeline sections 30, 70. The adaptor fitting 90 may have a first flange 91 at one end 93 having a first bolt hole pattern 95 and a second flange 97 at another end 99 having a second bolt hole pattern 101. The first and second flanges 91, 97 may differ from one another in bolt hole pattern 95, 101, diameter, or bolt hole pattern 95, 101 and diameter.

The first flange 91 may be adapted for connection to the inlet or outlet end 11, 21 (or 31, 41) of system 5, with the second flange 97 adapted for connection to the field meter run or main pipeline side. In other words, first flange 91 can be standard among adaptor fittings 90 but second flange 97 differs. In this way, the portable verification system 5 may be connected to a wide variety of different end treatment and main pipeline flange connections by simply changing the adaptor fitting 90.

Embodiments of a method of verifying a field ultrasonic gas flow meter when connected to a main pipeline transporting a gas include completing a circuit between the measurement section, the portable verification system 5, and the main pipeline; allowing a gas to flow through the field meter M and then through a calibrated ultrasonic gas flow meter 15 of the portable verification system 5; and comparing a volume of gas measured by the two meters M, 15.

Completing the circuit may include extending a first or a second linearly adjustable pipeline section 30, 70 (or both) from at least one of the inlet and outlet ends 11, 21. The method may also include changing a direction of the horizontal linearly adjustable pipeline section 30, for example, by swiveling the vertical linearly adjustable pipeline section 70 into a desired clock position or angle. Section 70 may be used vertically extend from the inlet or outlet ends 11, 21. The method may also include connecting an adaptor fitting 90 between at least one of the inlet end 11 and the downstream end of the measurement section or between the outlet end 21 and the main pipeline. An adaptor fitting 90 may also be used at the inlet or outlet ends 31, 41 of the linear adjustable pipeline sections 30, 70.

The method may also include changing a velocity of the volume of gas flowing through the portable verification system 5 (and therefore through the field meter M) between a first velocity and a second different velocity. The first velocity may be the field velocity. The second different velocity may be a velocity above or below the field velocity. Changing the velocity may be done by way of adjusting a flow control valve 19 located between the calibrated ultrasonic gas flow meter 15 and the outlet end 21 of the portable verification system 5.

The embodiments that have been described here provide illustrative examples. The disclosure extends to all functionally equivalent structures, methods, and uses that fall within the scope of the following claims.

What is claimed:

1. A portable verification system used to verify an in-field gas flow meter of a field meter run of a main pipeline, the portable verification system comprising:
    a reference meter section including a trailer and a reference meter run independent of the field meter run and mounted on the trailer;
    the reference meter run including piping having an inlet end connectable to a downstream end of the field meter run of the main pipeline, an outlet end connectable to the main pipeline, and an ultrasonic gas flow reference meter located between the inlet and outlet ends;
    at least one of the inlet and outlet ends including a linearly adjustable pipeline section comprising:
    an outer pipe;
    an inner pipe housed by and extendable from the outer pipe; and
    a slip joint configured for sealing the outer pipe about the inner pipe, the slip joint including a packing gland, a packing gland pocket, and a packing gland pusher.

2. A portable verification system according to claim 1 further comprising the reference meter section including a flow control valve located between the ultrasonic gas flow reference meter and the outlet end.

3. A portable verification system according to claim 1 wherein the linearly adjustable pipeline section is configured to extend in a horizontal direction, a vertical direction, or in both the horizontal and vertical directions.

4. A portable verification system according to claim 1 wherein the linearly adjustable pipeline section is configured to rotate, relative to the trailer, between different horizontal directions.

5. A portable verification system according to claim 1 further comprising the packing gland pocket including at least two O-rings and a spacer ring located between the at least two O-rings.

6. A portable verification system according to claim 1 further comprising at least one of the inlet and outlet ends including an adaptor fitting configured for connection to the field meter run or the main pipeline, respectively.

7. A portable verification system according to claim 1 further comprising the portable verification system including at least one turn between the inlet and outlet ends.

8. A method of verifying an in-field gas flow meter of a field meter run connected to a main pipeline when transporting a gas, the method comprising:
    completing a circuit between the field meter run, a portable verification system, and the main pipeline; and
    permitting a gas to flow from the main pipeline through the field meter run and into and through the portable verification system and back into the main pipeline;
    the completing the circuit including extending a linearly adjustable pipeline section from at least one of the inlet and outlet ends of the portable verification system for connection to the field meter run or the main pipeline;
    the linearly adjustable pipeline section comprising:
    an outer pipe;
    an inner pipe housed by and extendable from the outer pipe; and
    a slip joint configured for sealing the outer pipe about the inner pipe, the slip joint including a packing gland, a packing gland pocket, and a packing gland pusher;
    the portable verification system comprising:
    a reference meter section including a trailer and a reference meter run independent of the field meter run and mounted on the trailer, the reference meter run including piping having an inlet end connectable to a downstream end of the meter run, an outlet end connectable to the main pipeline, and an ultrasonic gas flow reference meter located between the inlet and outlet ends.

9. A method according to claim 8 further comprising changing a velocity of gas flowing through the portable verification system between a first velocity and a second different velocity.

10. A method according to claim 9 wherein the changing the velocity includes adjusting a flow control valve located between the ultrasonic reference gas flow meter and the main pipeline.

11. A method according to claim 8, the extending the linearly adjustable pipeline section in at least one of a horizontal direction and a vertical direction.

12. A method according to claim 8 further comprising changing a direction of the linearly extendable pipeline section relative to the inlet or outlet end.

13. A method according to claim 8 further comprising the completing the circuit to include connecting an adaptor fitting between at least one of:
    the inlet end and the downstream end of the measurement section; and
    the outlet end and the main pipeline.

14. A method according to claim 13 wherein the adaptor fitting includes a first flange at one end and a second flange at another end, the first and second flanges differing from one another in bolt hole pattern, diameter, or bolt hole pattern and diameter.

15. A method according to claim 8 further comprising the completing the circuit to include changing a height, a planar orientation, or a height and planar orientation of at least one of the inlet and outlet ends.

16. A method according to claim 8 further comprising disconnecting the portable verification system from the measurement section and the main pipeline.

17. A portable verification system used to verify an in-field gas flow meter of a field meter run of a main pipeline, the portable verification system comprising:
  a reference meter section including
    an inlet end connectable to a downstream end of meter run of the main pipeline,
    an outlet end connectable to the main pipeline, and
    an ultrasonic gas flow reference meter located between the inlet and outlet ends;
  at least one linearly adjustable pipeline section configured for connection to the inlet or outlet end, the linearly adjustable pipeline section comprising:
    an outer pipe;
    an inner pipe housed by and extendable from the outer pipe; and
    a slip joint configured for sealing the outer pipe about the inner pipe, the slip joint including a packing gland, a packing gland pocket, and a packing gland pusher.

18. A portable verification system according to claim 17 further comprising the reference meter section including a flow control valve located between the ultrasonic gas flow reference meter and the outlet end.

19. A portable verification system according to claim 17 further comprising at least one adaptor fitting configured for connection between the inlet end and the field meter run or between the outlet end and the main pipeline.

20. A portable verification system according to claim 17 further comprising the linearly adjustable pipeline section being adjustable in a horizontal direction, in a vertical direction, or in both the horizontal and vertical directions.

21. A portable verification system according to claim 17 further comprising the linear adjustable pipeline section being rotatable, relative to the reference meter section, between different horizontal.

22. A method of verifying an in-field gas flow meter of a field meter run connected to a main pipeline when transporting a gas, the method comprising:
  completing a circuit between the field meter run, a portable verification system, and the main pipeline; and
  permitting a gas to flow from the main pipeline through the field meter run and into and through the portable verification system and back into the main pipeline;
the portable verification system comprising:
  a reference meter section including an inlet end connectable to a downstream end of the meter run, an outlet end connectable to the main pipeline, and an ultrasonic gas flow reference meter located between the inlet and outlet ends;
the completing the circuit including:
  extending a linearly adjustable pipeline section from at least one of the inlet and outlet ends of the portable verification system; and
  connecting an adaptor fitting between at least one of:
    the inlet end and the downstream end of the measurement section, and the outlet end and the main pipeline;
  wherein the linearly adjustable pipeline section includes:
    an outer pipe;
    an inner pipe housed by and extendable from the outer pipe; and
    a slip joint configured for sealing the outer pipe about the inner pipe, the slip joint including a packing gland, a packing gland pocket and a packing gland pusher; and
  wherein the adaptor fitting includes a first flange at one end and a second flange at another end, the first and second flanges differing from one another in bolt hole pattern, diameter, or bolt hole pattern and diameter.

23. A method according to claim 22 further comprising changing a velocity of gas flowing through the portable verification system between a first velocity and a second different velocity.

24. A method according to claim 22, the linearly adjustable pipeline section being linearly adjustable in a horizontal direction, a vertical direction, or in both the horizontal and vertical directions.

25. A method according to claim 24 further comprising swiveling the linearly adjustable pipeline section relative to the inlet or outlet end into a desired horizontal direction.

26. A method according to claim 22 further comprising the completing the circuit to include changing a height, a planar orientation, or a height and planar orientation of at least one of the inlet and outlet ends.

* * * * *